(12) United States Patent
Toberman et al.

(10) Patent No.: US 11,148,246 B2
(45) Date of Patent: Oct. 19, 2021

(54) METHOD AND DEVICE FOR REMOVING MATERIAL FROM A SUBSTRATE

(71) Applicant: THE BOEING COMPANY, Chicago, IL (US)

(72) Inventors: Daniel L. Toberman, St. Charles, MO (US); David L. Fritsche, Foristell, MO (US); Michael R. Miller, Lake St. Louis, MO (US); Robert M. Wolf, Freeburg, IL (US)

(73) Assignee: THE BOEING COMPANY, Chicago, IL (US)

( * ) Notice: Subject to any disclaimer, the term of this patent is extended or adjusted under 35 U.S.C. 154(b) by 405 days.

(21) Appl. No.: 16/288,753

(22) Filed: Feb. 28, 2019

(65) Prior Publication Data
US 2019/0193229 A1 Jun. 27, 2019

Related U.S. Application Data

(63) Continuation of application No. 15/425,579, filed on Feb. 6, 2017, now Pat. No. 10,259,094.

(60) Provisional application No. 62/441,771, filed on Jan. 3, 2017.

(51) Int. Cl.
  *B24B 7/10*  (2006.01)
  *B64F 5/40*  (2017.01)

(52) U.S. Cl.
  CPC . *B24B 7/10* (2013.01); *B64F 5/40* (2017.01)

(58) Field of Classification Search
  CPC ..................................... B24B 7/10; B64F 5/40
  See application file for complete search history.

(56) References Cited

U.S. PATENT DOCUMENTS

| | | | | |
|---|---|---|---|---|
| 1,883,392 A | * | 10/1932 | Moll ........................ | B27C 5/10 144/136.1 |
| 2,000,300 A | * | 5/1935 | Scruby ................... | B29D 30/68 157/13 |
| 2,366,017 A | * | 12/1944 | Fortune ..................... | B27B 5/38 30/370 |
| 2,523,319 A | * | 9/1950 | Middlestadt ........ | E01C 23/0933 15/236.1 |
| 3,092,156 A | * | 6/1963 | Hayden ............... | B27B 17/0083 30/371 |

(Continued)

OTHER PUBLICATIONS

DREMEL DSM 20 Cutting Guide DSM840; "http://www.finehomebuilding.com/how-to/use-a-belt-sander-frame.aspx" 2 pages.

*Primary Examiner* — Marc Carlson
(74) *Attorney, Agent, or Firm* — The Small Patent Law Group, LLC; Jay Hoette

(57) ABSTRACT

A material removal device for removing material from a substrate includes a holder extending between first and second sides and a grinding wheel supported by the holder and being operable to remove the material from the substrate. The holder has a guide frame at the first side and a support frame at the second side. The guide frame has a first bottom surface and the support frame has a second bottom surface. The first and second bottom surfaces are vertically offset from each other. The grinding wheel has an axle supported by the guide frame and the support frame. The grinding wheel has a grinding surface located below the first bottom surface and above the second bottom surface.

20 Claims, 7 Drawing Sheets

(56) References Cited

U.S. PATENT DOCUMENTS

| | | | | |
|---|---|---|---|---|
| 3,357,745 | A * | 12/1967 | Cooper | E01C 23/0933 299/39.3 |
| 4,343,088 | A * | 8/1982 | Farley | B23D 45/003 30/273 |
| 4,552,192 | A * | 11/1985 | Eaves | B23Q 9/0014 144/136.8 |
| 4,644,701 | A * | 2/1987 | Arrigoni | B24B 23/08 409/110 |
| 4,891,858 | A * | 1/1990 | Wachter | A46B 7/00 15/179 |
| 4,972,589 | A * | 11/1990 | Povleski | B23B 45/003 30/122 |
| 4,982,589 | A | 1/1991 | Nomura | |
| 5,020,281 | A * | 6/1991 | Neff | B23D 47/126 30/388 |
| 5,457,877 | A * | 10/1995 | McDermott | H02G 1/1239 29/426.4 |
| 5,540,210 | A * | 7/1996 | Jones | B23D 45/16 125/13.01 |
| 5,669,371 | A * | 9/1997 | Rupprecht | B27B 9/00 125/13.01 |
| 5,974,674 | A * | 11/1999 | Kelly | B27B 5/08 144/136.95 |
| 6,349,712 | B1 * | 2/2002 | Halstead | B28D 1/045 125/12 |
| 6,503,125 | B1 * | 1/2003 | Harrington | B24B 55/06 451/28 |
| 6,568,088 | B1 * | 5/2003 | Ende | B23D 47/02 30/371 |
| 6,722,047 | B2 * | 4/2004 | Baber | B23D 47/126 125/13.03 |
| 6,776,078 | B2 * | 8/2004 | Gawazawa | B28D 5/024 83/881 |
| 7,770,574 | B1 * | 8/2010 | Ferreira | B28D 1/045 125/13.01 |
| 3,220,162 | A1 | 7/2012 | Rayner | |
| 8,220,162 | B2 * | 7/2012 | Rayner | B26D 1/205 30/240 |
| 8,616,938 | B1 * | 12/2013 | Mills | B24B 23/02 451/349 |
| 8,898,913 | B1 * | 12/2014 | Lones | B28D 1/04 30/375 |
| 9,126,309 | B2 * | 9/2015 | Ikonomov | B29C 73/26 |
| 9,266,293 | B2 * | 2/2016 | Ikonomov | B26D 3/003 |
| 9,533,430 | B1 * | 1/2017 | Kalb | B23D 47/02 |
| 9,808,961 | B2 * | 11/2017 | Jenkins | B28D 1/045 |
| 9,878,424 | B2 * | 1/2018 | Ikonomov | B24B 5/366 |
| 2002/0066190 | A1 * | 6/2002 | Fey | B27B 9/04 30/371 |
| 2003/0166386 | A1 * | 9/2003 | McDonald | B24B 23/005 451/360 |
| 2005/0200087 | A1 * | 9/2005 | Vasudeva | B25F 3/00 279/143 |
| 2009/0170405 | A1 * | 7/2009 | Barusta | B24B 41/04 451/11 |
| 2013/0213556 | A1 * | 8/2013 | Ikonomov | B24B 5/366 156/95 |
| 2014/0273751 | A1 * | 9/2014 | Bangert | B24B 23/005 451/5 |

* cited by examiner

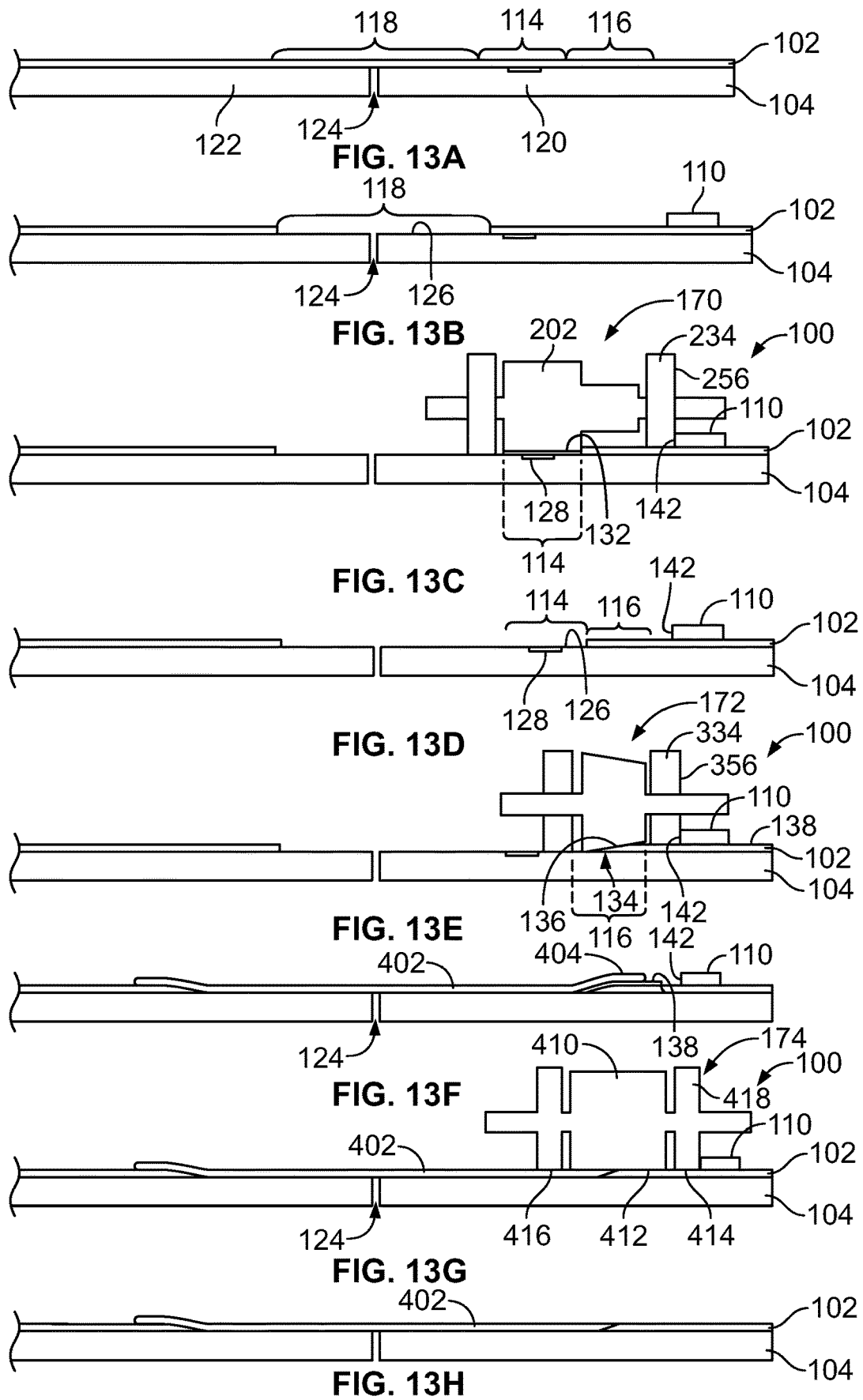

METHOD AND DEVICE FOR REMOVING MATERIAL FROM A SUBSTRATE

CROSS REFERENCE TO RELATED APPLICATIONS

This application is a continuation application of U.S. application Ser. No. 15/425,579, filed Feb. 6, 2017 (now U.S. Pat. No. 10,259,094, issued Apr. 16, 2019), which claims the benefit of U.S. Provisional Application No. 62/441,771, filed Jan. 3, 2017, the subject matter of which is herein incorporated by reference in its entirety.

BACKGROUND

The present disclosure relates generally to methods and devices for removing material from a substrate.

During the life of an aircraft, various portions of the aircraft may need to be repair or replaced. Removal of the portions of the aircraft is time consuming and performed in a manner that does not damage other portions of the aircraft. Some aircraft, such as military aircraft, have components configured to reduce a radar signature of the aircraft. For example, the exterior of the aircraft may have radar absorbing material (RAM) in certain locations. The RAM may cover one or more portions of the aircraft, such as panels, seams between panels, fastener heads, and the like. In some instances, the RAM needs to be removed to access one or more panels or parts of the aircraft.

Removal of the RAM is typically performed by hand sanding of the material in the desired location or by using a rotary cutter. The removal process is time consuming and labor intensive. For example, the removal rate commonly requires more than an hour per foot. In some instances, a metalized coating layer is provided on the surface of the aircraft, such as beneath the RAM. Removal of the RAM is performed without disturbing the metalized coating layer or damaging other sub-layers. Care must be taken to ensure that the metalized coating layer or other sub-layers are not damaged. Controlling the depth of sanding or cutting using the rotary cutter is difficult. The processed surface tends to be inconsistent due to the variable sanding or cutting. Additionally, in some instances, it is desirable to provide a taper at the edge of the removed RAM to allow re-filling of the RAM after repairing or replacing the panel. Accordingly, tapering the surface also increases the amount of hand sanding and thus the amount of time required to complete the repair As another example, portions of the aircraft made of composite materials may have various layers. It may be desirable to remove or change the thickness of one layer, such as a top layer, without affecting layers below the top layer. Sanding or scraping may be used, but the process is time consuming and it is difficult to control the depth of sanding or scraping.

Therefore, it would be advantageous to have a method and device for material removal from a substrate in a cost effective and reliable manner.

SUMMARY

In accordance with one embodiment, a material removal device for removing material from a substrate is provided including a holder extending between first and second sides and a grinding wheel supported by the holder and being operable to remove the material from the substrate. The holder has a guide frame at the first side and a support frame at the second side. The guide frame has a first bottom surface and the support frame has a second bottom surface. The first and second bottom surfaces are vertically offset from each other. The grinding wheel has an axle supported by the guide frame and the support frame. The grinding wheel has a grinding surface located below the first bottom surface and above the second bottom surface.

In accordance with another embodiment, a material removal system for removing material from a substrate is provided including a guide rail configured to be mounted to the substrate and having a datum edge. The material removal system includes a planing device for removing a first section of material and a tapering device for removing a second section of material. The planing device includes a planing device holder and a planing device grinding wheel supported by the planing device holder and being operable to remove the first section of material from the substrate. The planing device holder extends between first and second sides. The planing device holder has a guide frame at the first side and a support frame at the second side. The guide frame is configured to engage and slide along the datum edge of the guide rail during use. The guide frame has a first bottom surface and the support frame having a second bottom surface. The first and second bottom surfaces are vertically offset from each other. The planing device grinding wheel has a first axle supported by the guide frame and the support frame. The planing device grinding wheel has a planing grinding surface orientated parallel to the first axle. The tapering device includes a tapering device holder and a tapering device grinding wheel supported by the tapering device holder and being operable to remove the second section of material from the substrate. The tapering device holder extends between first and second sides. The tapering device holder has a guide frame at the first side and a support frame at the second side. The guide frame is configured to engage and slide along the datum edge of the guide rail during use. The guide frame has a first bottom surface and the support frame has a second bottom surface. The first and second bottom surfaces are vertically offset from each other. The tapering device grinding wheel has a second axle supported by the guide frame and the support frame. The tapering device grinding wheel has a tapering grinding surface orientated transverse to the second axle.

In accordance with a further embodiment, a material removal kit is provided including a planing device for removing a first section of material from a substrate and a tapering device for removing a second section of material from the substrate immediately adjacent the first section of material. The planing device includes a planing device grinding wheel having a first axle and a planing grinding surface orientated parallel to the first axle. The tapering device includes a tapering device grinding wheel having a second axle and a tapering grinding surface orientated transverse to the second axle. The planing device is configured to traverse along the substrate to remove the first section of material and the tapering device is configured to traverse along the substrate adjacent to the area where the first section was removed to remove the second section of material.

In accordance with yet another embodiment, a method of removing material from a substrate is provided. The method includes the step of mounting a guide rail having a datum edge to an external surface of the material on the substrate. The method includes the step of abutting a planing device against the datum edge and advancing the planing device along the substrate to remove a first section of the material from the substrate by rotating a planing device grinding wheel having a first axle and a planing grinding surface orientated parallel to the first axle. The method includes the step of abutting a tapering device against the datum edge and advancing the tapering device along the substrate to remove a second section of the material from the substrate immediately adjacent the first section of material by rotating a tapering device grinding wheel having a second axle and a tapering grinding surface orientated transverse to the second axle to taper the second section from the first section to an external surface of the material.

The features and functions that have been discussed can be achieved independently in various embodiments or may be combined in yet other embodiments, further details of which can be seen with reference to the following description and drawings.

BRIEF DESCRIPTION OF THE DRAWINGS

FIGS. 13A-13H show an exemplary material removal process using the material removal system to remove the material from the substrate and replace with new material after a repair in accordance with an exemplary embodiment.

DETAILED DESCRIPTION

Figure 1:
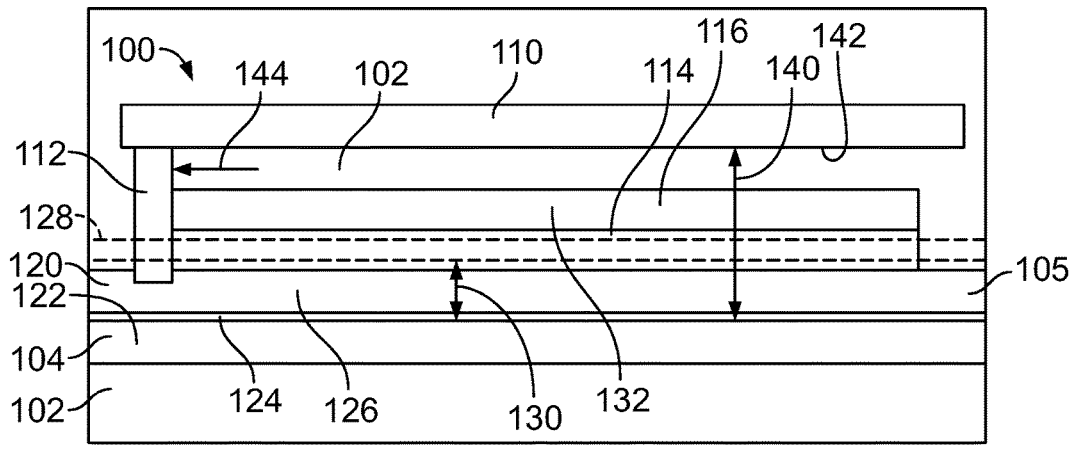
FIG. 1 is a top view of a material removal system in accordance with an exemplary embodiment for removing material from a substrate.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 2:
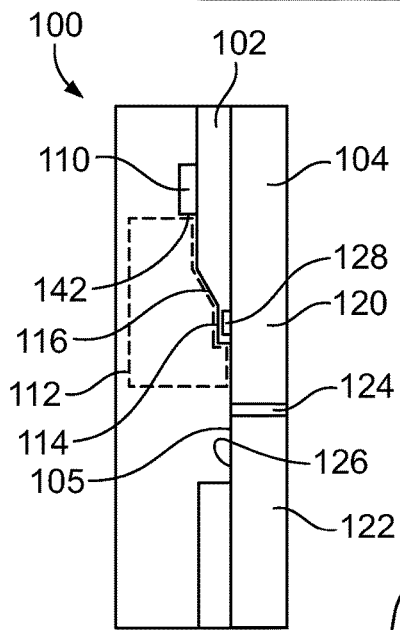
FIG. 2 is a side view of the material removal system.

FIG. 1 is a top view of a material removal system 100 in accordance with an exemplary embodiment for removing material 102 from a substrate 104. FIG. 2 is a side view of the material removal system 100. In an exemplary embodiment, the substrate 104 is a part of an aircraft, such as a panel or panels of a wing of the aircraft. However, the substrate 104 is not limited to panels of wings of aircraft, but rather may be any type of substrate 104 having one or more layers of material 102 to be removed. In an exemplary embodiment, the substrate 104 is a multi-layer substrate. The material 102 is a layer of the substrate 104 and may be an outer layer of the substrate 104. The material 102 may be applied directly to a base layer 105 of the substrate 104 or other layers of the substrate may be provided between the base layer 105 and the material 102. In various embodiments, other layers may be provided to the material, such as a paint layer. The material removal system 100 is used for controlled removal of the material 102, such as a controlled section of the material 102, without damaging other layers of the substrate 104, such as the base layer 105 of the substrate 104 or other layers that are deposited between the material 102 and the base layer 105 of the substrate 104. In various embodiments, some of the material 102 remains after the material removal system 100 is used. The material removal system 100 controls the location and the depth of material removal. The material removal system 100 is used to easily and quickly remove the material 102.

The material removal system 100 includes a guide rail 110 and one or more material removing devices 112 for removing the material 102. In one embodiment, the guide rail 110 may be mounted directly to the substrate 104, such as to an outer layer of the substrate. For example, the guide rail 110 may be mounted directly to a section of the material 102. The guide rail 110 may be secured using mounting features, such as vacuum suction features. The guide rail 110 guides movement of the material removing devices 112 along the substrate 104 to remove the material 102 from defined locations. Optionally, the material 102 may be removed in multiple sections 114, 116 with different passes by different material removing devices 112. Alternatively, a single material removing device 112 may remove the material 102 from the sections 114, 116 by a single pass.

In an exemplary embodiment, the substrate 104 includes a first panel 120 and a second panel 122 adjacent the first panel 120 at a seam or joint 124. The material 102 may be used to cover the panels 120, 122, such as a protective layer for the substrate 104. In an exemplary embodiment, the material 102 is radar absorbing material (RAM) covering the various portions or panels 120, 122 of the aircraft. In normal use, both panels 120, 122 and the joint 124 are covered by the material 102. However, for maintenance, repair or replacement of parts of the aircraft, one or both of the panels 120, 122 may need to be accessed. For example, one of the panels 120, 122 may need to be removed. The material 102 is removed to expose the joint 124 to allow the panels 120, 122 to be removed. In an exemplary embodiment, when the aircraft is reassembled, the layer of the material 102 is reapplied. In an exemplary embodiment, the material 102 is removed in a manner that allows the reapplied material 102 to be efficiently and effectively integrated onto the substrate 104. For example, the edges of the removed material 102 may be tapered to allow the reapplied material to be applied onto the substrate 104 at a tapered joint.

In an exemplary embodiment, the base layer 105 of the substrate 104 is a composite material; however, the base layer 105 of the substrate 104 may be other materials, such as a metal material. The material removing devices 112 remove the material 102 without damaging other layers of the substrate 104, such as the base layer 105 or layers deposited between the base layer 105 and the material 102. For example, the substrate 104 may include one or more composite layers 126, a primer layer (not shown), a sealing layer (not shown) and/or a metallized coating layer 128. The composite layer(s) 126 may define the base layer(s) 105. In the illustrated embodiment, the metallized coating layer 128 is applied as a strip a distance 130 from the joint 124. The metallized coating layer 128 may surround the joint 124 and/or the joint 124 may surround the metallized coating layer 128. For example, the second panel 122 may be a removable panel door having a rectangular joint 124 surrounding the removable panel door. The joint 124 may be sealed with a sealant. The metallized coating layer 128 may be provided on the first panel 120 in a rectangular shape around the removable panel door and/or the metallized coating layer 128 may be provided on the second panel 122 in a rectangular shape inside the outer edge of the removable panel door. In alternative embodiments, rather than being a strip of material, the metallized coating layer 128 covers a larger area of the first panel 120 and/or the second panel 122, such as substantially the entire panels 120, 122. For example, the metallized coating layer 128 may be applied as a coating over the entire panel 120 and/or 122. Optionally, the metallized coating layer 128 may cover substantially the entire area of the first panel 120 and/or the second panel 122 other than a strip at the edges of the panels 120, 122 at the joint 124. For example, the metallized coating layer 128 may be applied a setback distance 130 from the joint 124 and cover the rest of the panel 120 and/or 122. In other various embodiments, the material removing devices 112 are used to remove the material 102 without regard to a metallized coating layer. For example, the substrate 104 may be provided without the metallized coating layer 128. In various embodiments, any portion of the metallized coating layer 128 damaged during material removal may be repaired by reapplying the metalized coating layer 128 prior to reapplying the material 102. For example, portions of the metallized coating layer 128 near the joint 124 may be inadvertently removed during the material removal process; however, other portions of the metallized coating layer 128, such as under the section(s) 114 and/or 116 remain undamaged by the use of the material removing devices 112.

In an exemplary embodiment, during material removal, the material 102 is removed in the joint area inside the metallized coating layer 128. The material 102 may be removed down to the base layer 105. Removal of the material 102 does not affect the metallized coating layer 128 because the metallized coating layer 128 is setback from such area where the material 102 is completely removed. The material 102 may be removed in such area by one of the material removing devices 112 or by another material removing device such as a grinder, cutter, and the like. Control of the depth of removal of the material 102 is less critical in such area as the area does not include the metallized coating layer 128. The material removing devices 112 are used to remove the material 102 in the area of the metallized coating layer 128. For example, in an exemplary embodiment, the material removing devices 112 remove substantially all of the material 102 while leaving a thin remaining layer 132 of the material 102 above the metallized coating layer 128. The thin remaining layer 132 may later be hand sanded down to the metallized coating layer 128. By leaving the thin remaining layer 132, the material removing devices 112 do not damage the metallized coating layer 128. The thin remaining layer 132 acts as a buffer between the material removing devices 112 and the metallized coating layer 128. The thin remaining layer 132 is able to be removed quickly and easily because the remaining layer 132 is relatively thin as compared to the starting thickness of the material 102. In various embodiments, the thin remaining layer 132 is less than 50% of the original thickness of the material 102. In various embodiments, the thin remaining layer 132 is less than 25% of the original thickness of the material 102, such as less than 10% of the original thickness of the material 102. For example, in various embodiments, the original thickness of the material 102 may be approximately 0.05" thick and the thin remaining layer may be approximately 0.01" thick or less. Other thicknesses are possible in alternative embodiments. The material removal is controlled by the precision tolerances of the material removing devices 112.

In an exemplary embodiment, the guide rail 110 is used to guide removal of the material 102. For example, the guide rail 110 is positioned an offset distance 140 from the joint 124. The guide rail 110 has a datum edge 142 along the interior edge thereof. The guide rail 110 guides advancing of the material removal devices 112 in a guiding direction 144 along the substrate 104 as the material removing devices 112 are advanced along the guide rail 110. The datum edge 142 positions the material removing devices 112 to control the lateral position of the material removal devices 112, and thus a lateral location of material being removed from the substrate 104. For example, the datum edge 142 positions the material removing devices 112 predetermined distances from the joint 124 to control material removal in the area of the metallized coating layer 128. The guide rail 110 is mounted to the substrate 104 and secured thereto. For example, the guide rail 110 may be mounted using adhesive, fasteners, suction cups, or other fastening means. In an exemplary embodiment, the guide rail 110 is mounted to the exterior of the layer of material 102 on the substrate 104 outside of a removal area of the material 102. For example, the material 102 in the area where the guide rail 110 is mounted is not designated to be removed.

Figure 3:
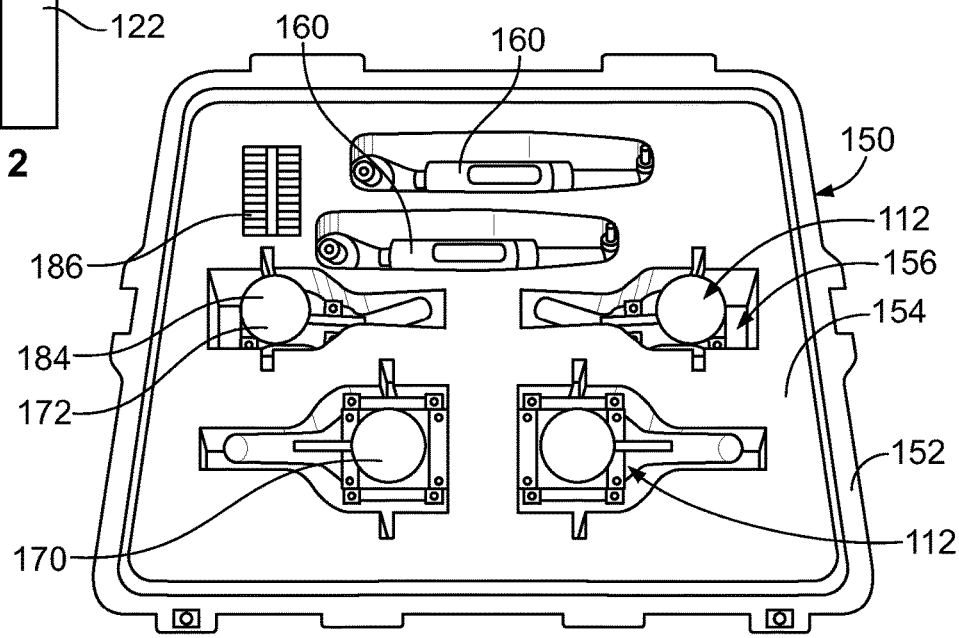
FIG. 3 is a top view of a material removal kit in accordance with an exemplary embodiment.
Figure 4:
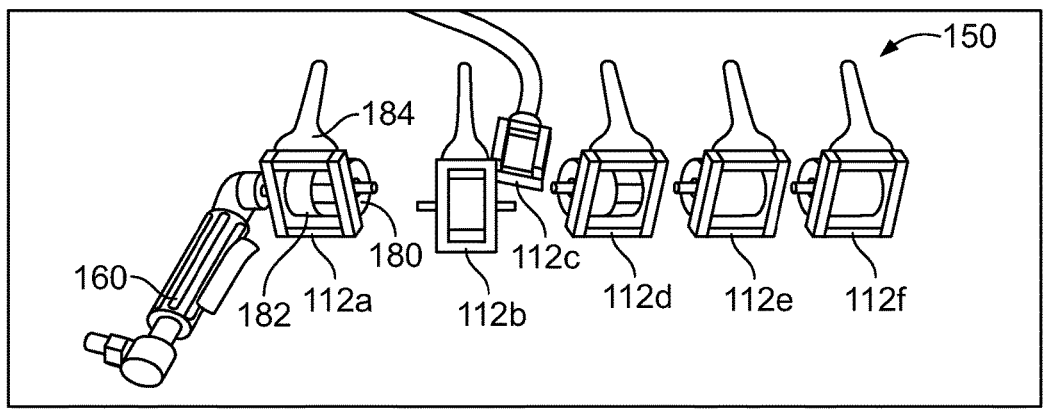
FIG. 4 shows components of the material removal kit.

FIG. 3 is a top view of a material removal kit 150 in accordance with an exemplary embodiment. FIG. 4 shows components of the material removal kit 150. The material removal kit 150 includes a housing or case 152 that houses the components of the material removal kit 150. The material removal kit 150 includes a tray 154 inside the case 152 holding the components of the material removal kit 150. A lid (not shown) may be secured to the case 152 and closed to house the components of the material removal kit 150. The tray 154 includes slots 156 that receive corresponding components of the material removal kit 150.

In an exemplary embodiment, the material removal kit 150 includes a plurality of the material removing devices 112a, 112b, 112c, 112d, 112e, 112f (FIG. 4). Any number of the material removing devices 112 may be included in the material removal kit 150. The various material removing devices 112 may have different sizes, shapes or other features for removing the material 102. For example, in an exemplary embodiment, each of the material removing devices 112 is configured to remove material at a single predetermined depth. Thus, the set of material removing devices 112 may be utilized to remove material at a plurality of different depths, along different planes, at different lateral positions from the guide rail, e.g. the set of material removing devices 112 include material removing devices having different cutting widths, cutting depths, cutting angles, and the like. In an exemplary embodiment, the material removing devices 112 include planing devices 170, tapering devices 172, and may include other types of material removing devices. The planing devices 170 are configured to remove the material 102 along a generally horizontal plane with respect to the substrate 104. The tapering devices 172 are configured to remove the material 102 along generally angled planes that are non-horizontal with respect to the substrate 104.

In an exemplary embodiment, each material removing device 112 includes a holder 180, a grinding wheel 182 held by the holder 180, and a cover 184 attached to the holder 180 and partially surrounding the grinding wheel 182. The grinding wheels 182 of the different material removing devices 112 may have different features, such as different widths, different locations within the holders 180, different shapes, and the like. In operation, the holder 180, which may also be referred to herein as a chassis, provides the structural support for the grinding wheel 182, the cover 184, bearings, and other associated parts to ensure that the grinding wheel 182 is maintained at a precise position with respect to the holder 180 as described in more detail below.

In an exemplary embodiment, the material removal kit 150 includes one or more actuators 160 used to operate the material removing devices 112. For example, the actuator 160 may be a pneumatic actuator used to rotate the corresponding grinding wheel 182 when operated. Other types of actuators may be used in alternative embodiments, such as electric actuators, hydraulic actuators, and the like.

In an exemplary embodiment, the material removal kit 150 includes feet 186 configured to be removably coupled to the holders 180. The feet 186 are used to adjust the height of the holders 180, such as to control the depth of material removal during use. Optionally, each different material removing device 112 may include a corresponding set of feet 186 for adjusting such material removing device 112. The feet 186 may be matched to the material removing device 112 for precision material removal. For example, the feet 186 may be matched to the particular grinding wheel 182. The feet 186 may be matched by milling the feet 186 to a particular thickness corresponding to the location of the feet 186 on the holder 180 holding a particular grinding wheel 182. As such, the material removing devices 112 provide precision material removal.

Figure 5:
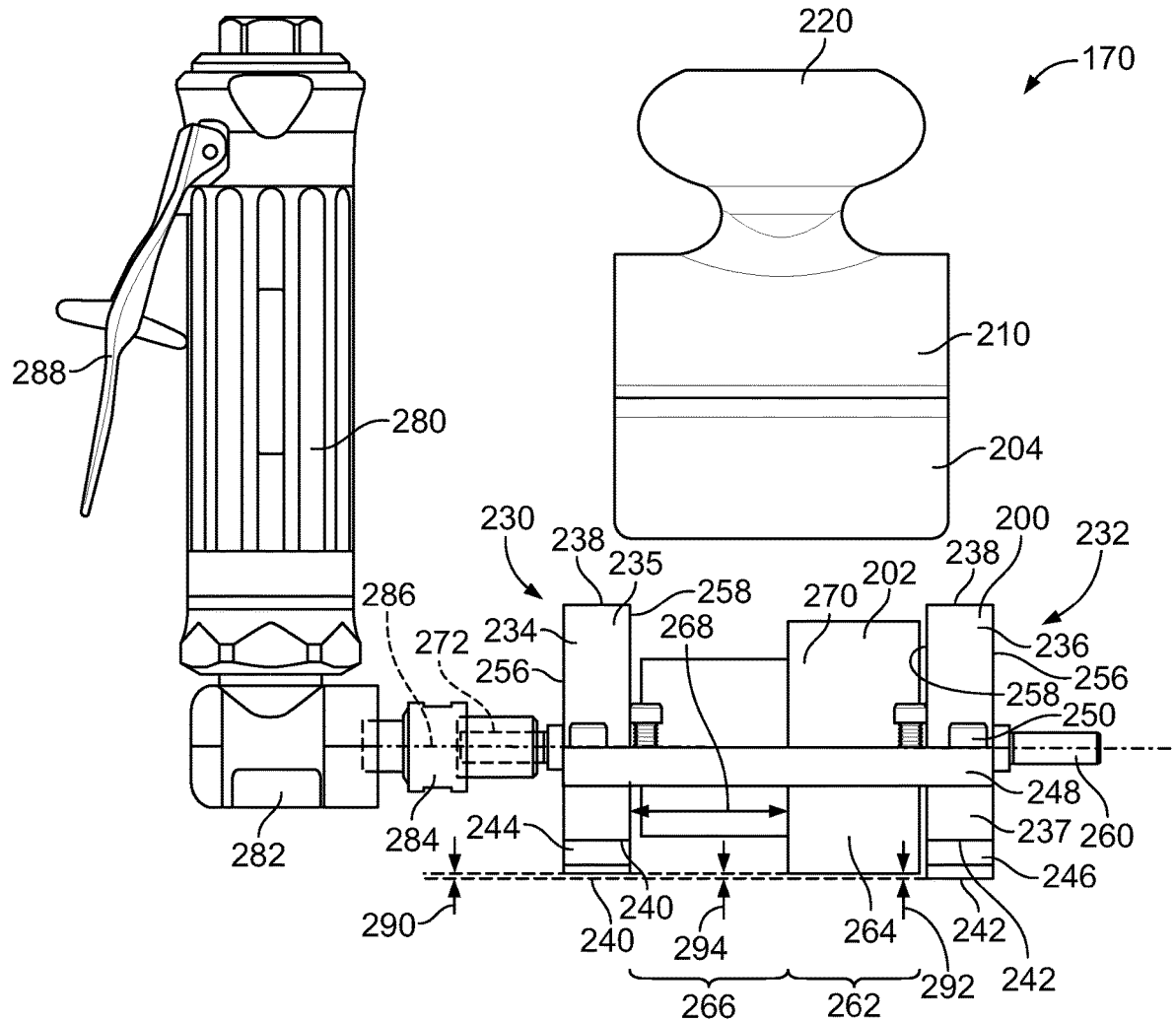
FIG. 5 is a side, exploded view of a planing device of the material removal system in accordance with an exemplary embodiment.
Figure 6:
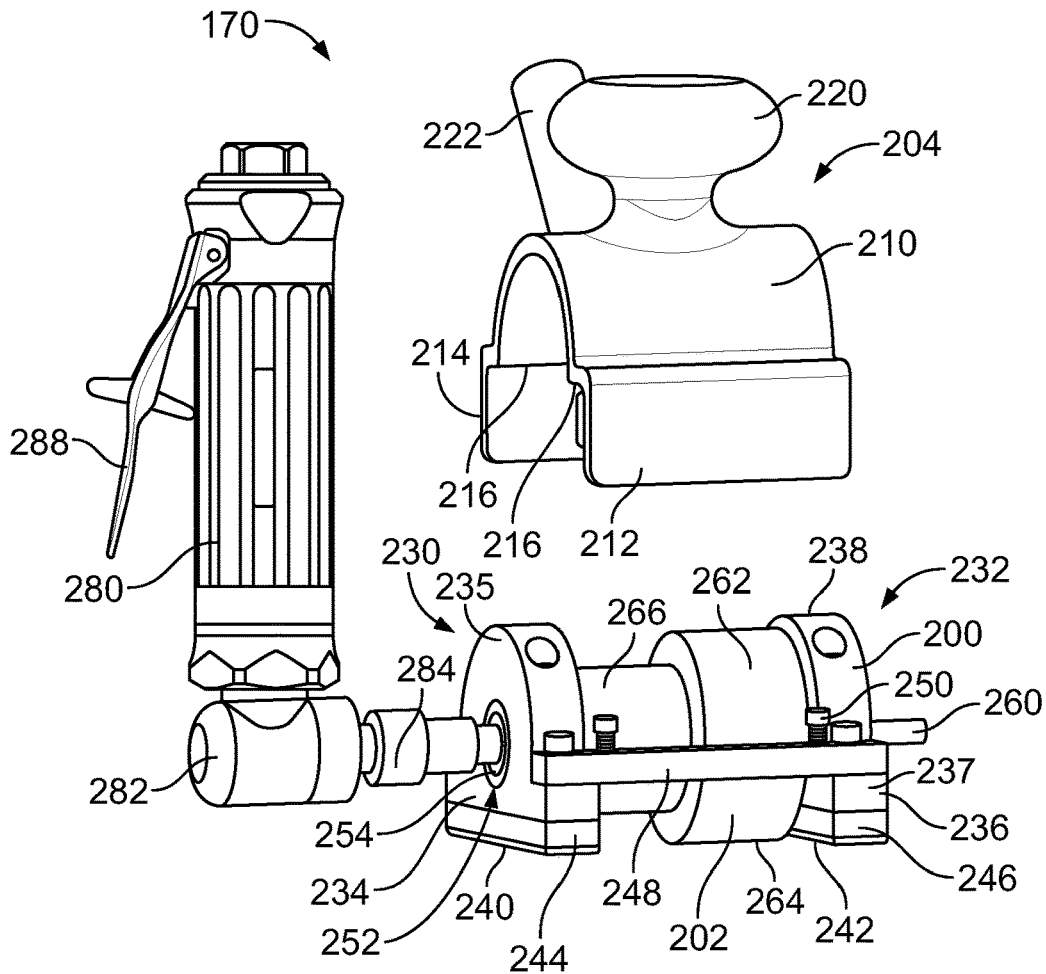
FIG. 6 is a perspective, exploded view of the planing device.

FIG. 5 is a side, exploded view of the planing device 170 coupled to a corresponding actuator 160, in accordance with an exemplary embodiment, which is one of the material removing devices 112. FIG. 6 is a perspective, exploded view of the planing device 170. The planing device 170 includes a planing device holder 200 (which may be referred to hereinafter as simply holder 200), a planing device grinding wheel 202 (which may be referred to hereinafter as simply grinding wheel 202) held by the holder 200, and a planing device cover 204 (which may be referred to hereinafter as simply cover 204) attached to the holder 200 and partially surrounding the grinding wheel 202.

The cover 204 partially surrounds the grinding wheel 202 and also functions to protect the grinding wheel 202 and the operator. The cover 204 includes a body 210 extending between a front 212 and a rear 214. Optionally, the body 210 may be curved between the front 212 and the rear 214. The cover 204 includes ledges 216 at the front 212 and the rear 214 that rest on the holder 200 to secure the cover 204 to the holder 200. The cover 204 includes a handle 220 at a top of the cover 204. In the illustrated embodiment, the handle 220 is knob shaped, however the handle 220 may have other shapes in alternative embodiments. The handle 220 is configured to be grabbed by the operator to manipulate, transport and advance the planing device 170 during operation. The cover 204 includes a funnel 222 at the rear 214. The funnel 222 collects the material removed by the grinding wheel 202 during operation. In an exemplary embodiment, the funnel 222 is connected to a vacuum system to remove the material during operation of the planing device 170. The funnel 222 may be tube shaped; however, the funnel 222 may have other shapes in alternative embodiments. The funnel 222 may be enlarged at the bottom to gather the removed material.

The holder 200 extends between first and second sides 230, 232. The holder 200 has a guide frame 234 at the first side 230 and a support frame 236 at the second side 232. The guide frame 234 has a frame body 235 and the support frame 236 has a frame body 237. The frame bodies 235, 237 may be metal plates or blocks used to support the grinding wheel 202. In the illustrated embodiment, the frames 234, 236 have curved top surfaces 238. The guide frame 234 has a planar first bottom surface 240 and the support frame 236 has a planar second bottom surface 242. In one mode of operation, the bottom surfaces 240, 242 of the holder 200 are defined by the bottom surfaces 240a, 242a of the frame bodies 235, 237. In an optional embodiment, the holder 200 may include a first foot 244 and a second foot 246 (together defining feet 244, 246) coupled to the bottom surfaces 240a, 242a of the frame bodes 235, 237, respectively. In this embodiment, the first foot 244 defines the first bottom surface 240b of the holder 200 and the second foot 246 defines the second bottom surface 242b of the holder 200. Optionally, the feet 244, 246 are removable and replaceable, with other feet having different thicknesses, to adjust the height of the holder 200, as is described in more detail below. The bottom surfaces 240, 242 are configured to rest on the substrate 104 as the planing device 170 is advanced along the substrate 104 to remove the material 102. The bottom ends of the feet 244, 246 may be beveled or tapered.

In an exemplary embodiment without the feet 244, 246, a distance between an axis of rotation 286 of the spindle 282 (which supports the grinding wheel 202) and the bottom surfaces 240 and 242 (which in this example are the bottom surfaces 240a, 242a of the frame bodies 235, 237) is fixed and non-adjustable. Different grinding depths may be achieved by using different planing devices having different precision dimensions. However, in embodiments using the feet 244, 246, the distance between the axis of rotation 286 of the spindle 282 and the bottom surfaces 240 and 242 (which in this example are the bottom surfaces 240b, 242b) is adjustable by utilizing feet of different heights. Optionally, multiple feet 244, 246 may be stacked to achieve different grinding heights.

In some embodiments, and as described in more detail below, a distance between the axis or rotation 286 and the bottom surface 240 is different than a distance between the axis of rotation 286 and the bottom surface 242. In operation, a distance between the grinding surface of the grinding wheel 202 and the bottom surfaces 240 and 242 is precisely determined and represents the depth of cut (or thickness of material) that is desired to be removed from the substrate 104 during the grinding process. The distance may be precisely controlled by milling the bottom surfaces 240, 242 (of the frame bodies 235, 237 or of the feet 244, 246) relative to the spindle 282. In operation, when the grinding operation is initiated, one or neither of the bottom surfaces 240 and/or 242 may contact the substrate 104. However, as material is removed during the grinding operation, initially one of the bottom surfaces contacts the substrate 104. The grinding operation, for a particular section of the material 102, is completed when both of the bottom surfaces 240 and 242 are in contact with the substrate 104, which indicates that no further material can be removed with this particular planer from this particular section. The planing device 170 may then be advanced forward to continue to remove a strip of the material 102.

The holder 200 includes a pair of cross frames 248 extending between the guide frame 234 and the support frame 236. In an exemplary embodiment, the frames 234, 236, 248 are separate pieces secured together. For example, the frames 234, 236, 248 may be secured using fasteners 250. The frames 234, 236, 248 are assembled with the grinding wheel 202. For example, the frames 234, 236 are discrete parts that are coupled to opposite sides of the grinding wheel 202 and secured together using the cross frames 248. In alternative embodiments, the cross frames 248 may be integral with the guide frame 234 and/or the support frame 236.

In an exemplary embodiment, the frames 234, 236 include openings 252 for receiving the grinding wheel 202. Bearings 254 are received in the openings 252 for supporting the grinding wheel 202. The openings 252 are open between an exterior surface 256 and an interior surface 258 of the corresponding frame 234, 236. The interior surfaces 258 of the frames 234, 236 face each other across a gap that receives the grinding wheel 202. Portions of the grinding wheel 202 may extend beyond the exterior surface 256 of the guide frame 234 and/or beyond the exterior surface 256 of the support frame 236. In use, the exterior surface 256 of the guide frame 236 is configured to abut against the datum edge 142 (shown in FIG. 2) of the guide rail 110 (shown in FIG. 2) to guide advancing of the planing device 170 during use. The bottom surfaces 240, 242 are located precise distances from the openings 252 to control positioning of the grinding wheel 202 relative to the bottom surfaces 240, 242.

The grinding wheel 202 includes an axle 260 and a grinding section 262 along the axle 260. The grinding section 262 has a grinding surface 264 used for removing the material 102 when the planing device 170 is operated. The grinding surface 264 is the exterior surface of the grinding section 262. The grinding surface 264 extends circumferentially around the grinding wheel 202. In the illustrated embodiment, the grinding surface 264 of the planing device grinding wheel 202 is oriented parallel to the axle 260. The grinding surface 264 is used to grind away the material 102 to create a planar, such as horizontal, surface on the substrate 104. In an exemplary embodiment, the grinding surface 264 is used to remove the material 102 and is oriented to leave the thin remaining layer 132 (shown in FIG. 2) of the material 102 on the substrate 104 when the planing device 170 is used.

Optionally, the grinding wheel 202 includes a spacing section 266 along the axle 260. The spacing section 266 is positioned adjacent the grinding section 262. Optionally, the spacing section 266 has a smaller diameter than the grinding section 264. The spacing section 266 spaces the grinding section 262 a longitudinal distance 268 from the interior surface 258 of the guide frame 234. As such, the position of the grinding surface 264 relative to the exterior surface 256 of the guide frame 234, and thus relative to the datum edge 142, is precisely controlled. In various embodiments, the grinding wheel 202 includes a spacing section on the outer side of the grinding section 264, such as between the grinding section 264 and the In an exemplary embodiment, the grinding wheel 202 is manufactured from a common, unitary body 270. For example, the axle 260, the spacing section 266 and the grinding section 262 are all milled from a single piece of metal. An end 272 of the axle 260 extends beyond the exterior surface 256 of the guide frame 234 for attachment to the actuator 160. The actuator 160 is operated to rotate the axle 260, which causes rotation of the grinding surface 264.

The actuator 160 includes a motor 280 operated to rotate a spindle 282. A chuck 284 is coupled to the spindle 282. The chuck 284 is secured to the axle 260 to rotate the axle 260. In an exemplary embodiment, the axis of rotation 286 of the spindle 282 and the axle 260 is oriented perpendicular to the motor 280. A throttle 288 is operably coupled to the motor 280 to control the speed of rotation of the actuator 160 and the grinding wheel 202. In other embodiments, the grinding wheel 202 may be operably coupled to the actuator 160 by other means.

In an exemplary embodiment, the planing device 170 is used for precision material removal from the substrate 104. For example, the grinding surface 264 is used to remove the material 102 without damaging the metallized coating layer 128 (shown in FIG. 1), and to leave behind the thin remaining layer 132. The vertical height of the first and second bottom surfaces 240, 242 relative to the grinding surface 264 are controlled with precision to achieve the desired material removal. In an exemplary embodiment, because the guide frame 234 slides along one section of the substrate 104 while the support frame 236 slides along a different section of the substrate 104 (for example, the guide frame 234 slides along the exterior of the material 102 while the support frame 236 slides along the composite layer 126), the vertical height of the grinding surface 264 relative to the first bottom surface 240 needs to be controlled and the vertical height of the grinding surface 264 relative to the second bottom surface 242 needs to be controlled.

In an exemplary embodiment, the first bottom surface 240 is vertically offset relative to the second bottom surface 242 a first vertical distance 290 (FIG. 5). For example, the first bottom surface 240 is relatively higher and the second bottom surface 242 is relatively lower, i.e. the first bottom surface 240 is set a first distance 291 from the axis of rotation 286 of the spindle 282 and the second bottom surface 242 is set a second distance 293 from the axis of rotation 286 of the spindle 282, wherein the first distance 291 is less than the second distance 293. Having the first and second bottom surfaces 240, 242 vertically offset allows the guide frame 234 to be supported by different layers of the substrate 104 while maintaining the proper or desired orientation of the grinding surface 264 relative to the substrate 104. To form the thin remaining layer 132, the grinding surface 264 is positioned above the second bottom surface 242 a second vertical distance 292 (FIG. 5). To remove a thickness of the material 102, the grinding surface 264 is positioned below the first bottom surface 240 a third vertical distance 294 (FIG. 5). As such, the grinding surface 264 is at a vertical height between the first bottom surface 240 and the second bottom surface 242. In an exemplary embodiment, the second vertical distance 292 defines the thickness of the thin remaining layer 132 (shown in FIG. 2) and the third vertical distance 294 defines the thickness of the material removed by the planing device 170. In an exemplary embodiment, the holder 200 has a support plane defined between the guide frame 234 and the support frame 236, such as between the first and second bottom surfaces 240, 242 at the interior surfaces 258 of the frames 234, 236. Because the first and second bottom surfaces 240, 242 are at different vertical heights, the support plane is non-horizontal. In an exemplary embodiment, the grinding surface 264 is nonparallel to the support plane and is oriented at an offset angle. For example, the grinding surface 264 is generally horizontal and the support plane is angled upward between the bottom surfaces 242, 240.

Figure 7:
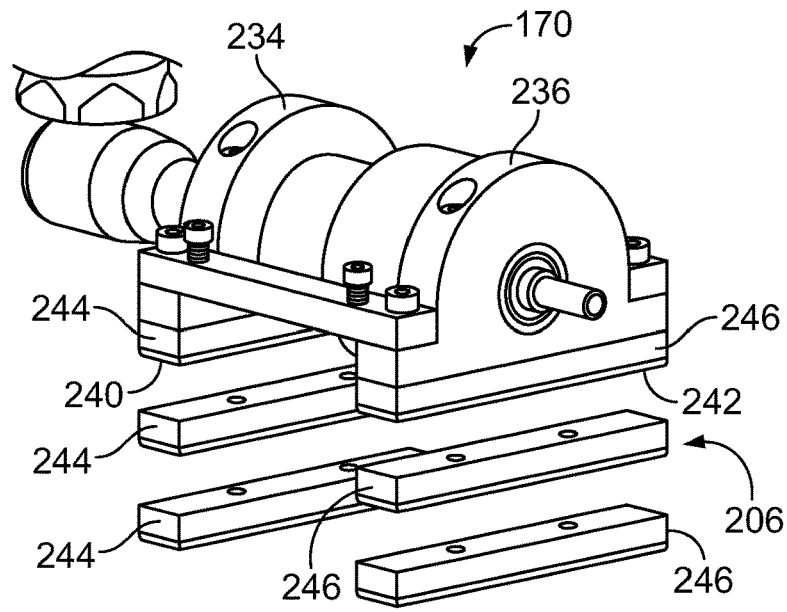
FIG. 7 illustrates a portion of the planing device.

FIG. 7 illustrates a portion of the planing device 170 showing sets of feet 206 that may be coupled to the holder 200. In the illustrated embodiment, the sets of feet 206 include a first set of feet 206a and a second set of feet 206b. The first set of feet 206a can include one or more feet 244 having the same or varying thicknesses and are configured to couple to, and therefore adjust a vertical height of the bottom surface 240b. Similarly, the second set of feet 206b can include one or more feet 246 having the same or varying thicknesses and are configured to couple to, and therefore adjust a vertical height of the bottom surface 242b. The feet 206 are removable and replaceable to change the vertical heights of the frames 234, 236. The feet 206 have different thicknesses to change the amount of material 102 that may be removed by the planing device 170. For example, when using thicker feet 206, the grinding wheel 202 removes less material 102. The feet 206 are attached to the frames 234, 236, such as using fasteners and may be removed and replaced with different feet 206. In an exemplary embodiment, the feet 206 are matched to the grinding wheel 202. For example, the feet 206 may be milled to be matched to the grinding surface 264 of the grinding wheel 202. As such, tolerances in the frames 234, 236 and the grinding wheel 202 may be accounted for by precisely milling the bottom surfaces 240b, 242b of the feet 206 to correspond to the vertical height of the grinding surface 264.

Figure 8:
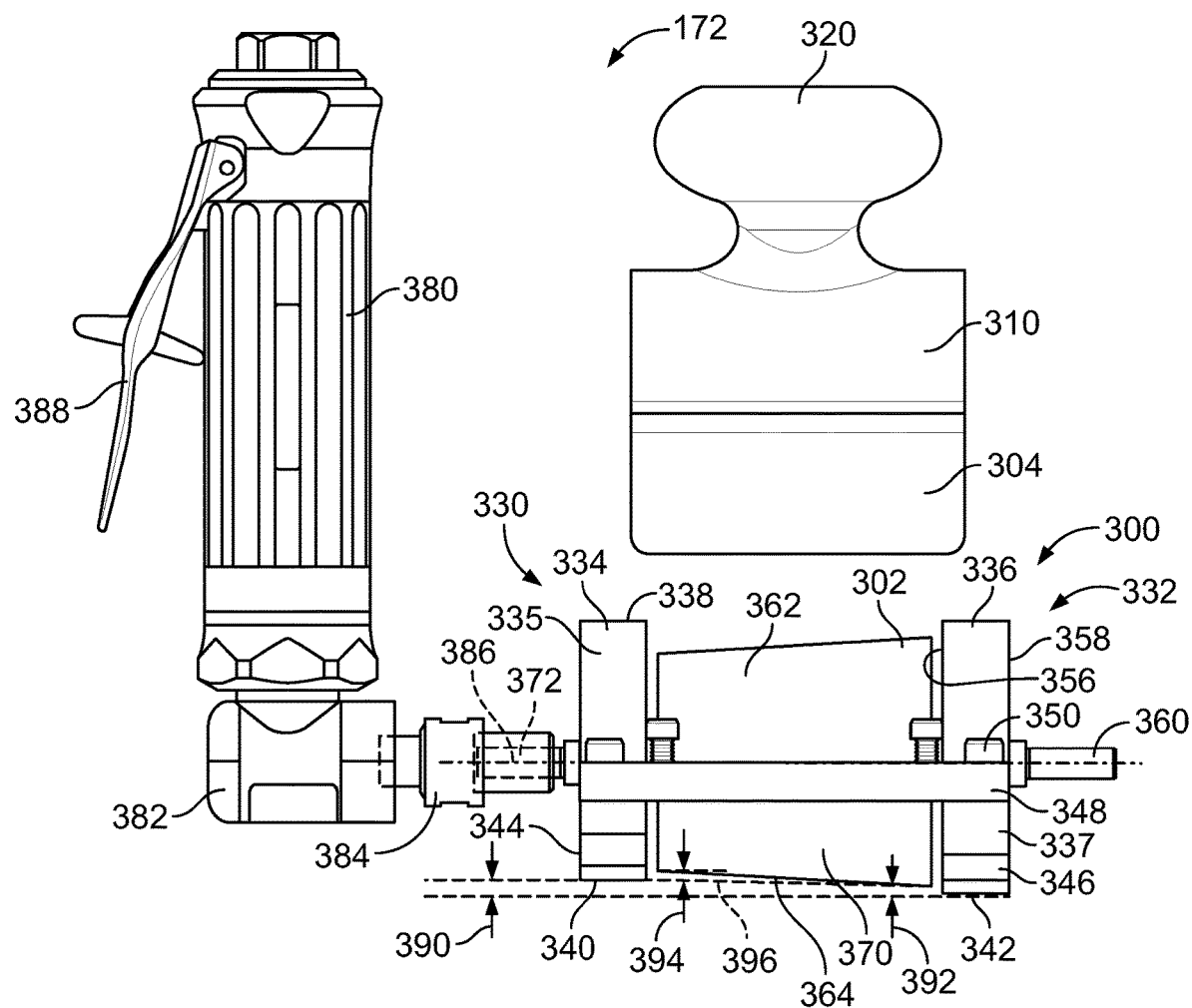
FIG. 8 is a side, exploded view of a tapering device of the material removal system in accordance with an exemplary embodiment.
Figure 9:
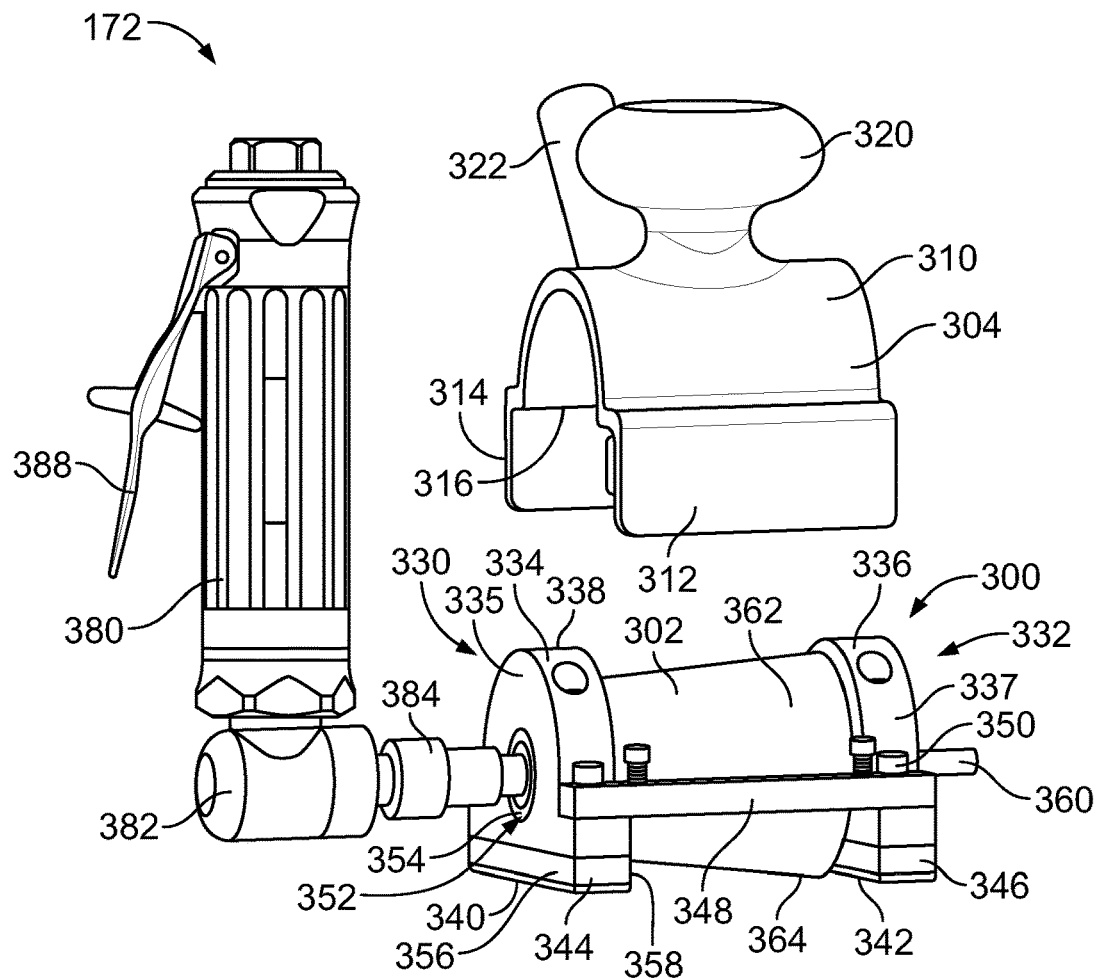
FIG. 9 is a perspective, exploded view of the tapering device.
Figure 10:
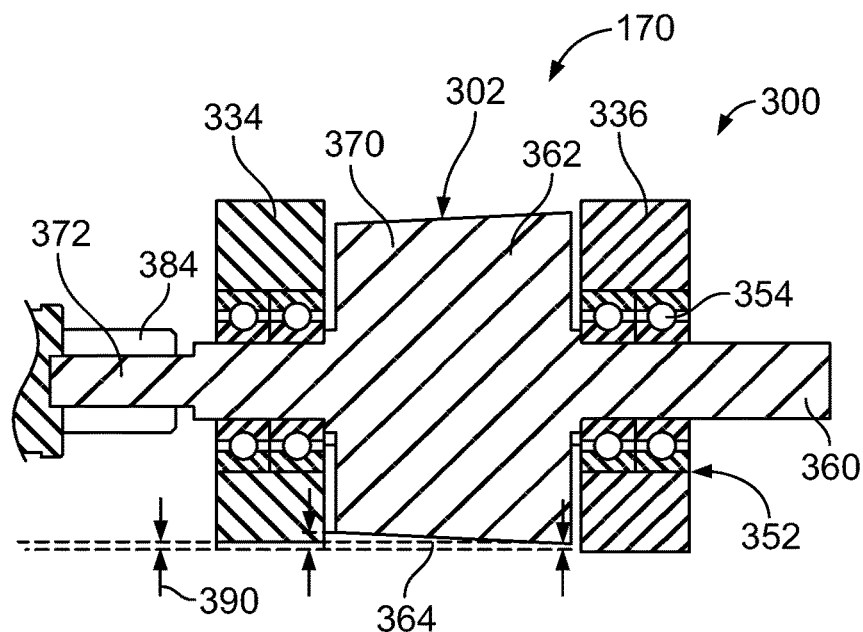
FIG. 10 is a cross-sectional view of a portion of the tapering device.

FIG. 8 is a side, exploded view of the tapering device 172 in accordance with an exemplary embodiment, which is one of the material removing devices 112. FIG. 9 is a perspective, exploded view of the tapering device 172. FIG. 10 is a cross-sectional view of a portion of the tapering device 172. The tapering device 172 includes a tapering device holder 300 (which may be referred to hereinafter as simply holder 300), a tapering device grinding wheel 302 (which may be referred to hereinafter as simply grinding wheel 302) held by the holder 180, and a tapering device cover 304 (which may be referred to hereinafter as simply cover 304) attached to the holder 300 and partially surrounding the grinding wheel 302.

The cover 304 surrounds and protects the grinding wheel 302. The cover 304 includes a body 310 extending between a front 312 and a rear 314. Optionally, the body 310 may be curved between the front 312 and the rear 314. The cover 304 includes ledges 316 at the front 312 and the rear 314 that rest on the holder 300 to secure the cover 304 to the holder 300. The cover 304 includes a handle 320 at a top of the cover 304. In the illustrated embodiment, the handle 320 is knob shaped, however the handle 320 may have other shapes in alternative embodiments. The handle 320 is configured to be grabbed by the operator to manipulate, transport and advanced the tapering device 172 during operation. The cover 304 includes a funnel 322 at the rear 314. The funnel 322 collects the material removed by the grinding wheel 302 during operation. In an exemplary embodiment, the funnel 322 is connected to a vacuum system to remove the material during operation of the tapering device 172. The funnel 322 may be tube shaped; however, the funnel 322 may have other shapes in alternative embodiments. The funnel 322 may be enlarged at the bottom to gather the removed material.

The holder 300 extends between first and second sides 330, 332. The holder 300 has a guide frame 334 at the first side 330 and a support frame 336 at the second side 332. The guide frame 334 has a frame body 335 and the support frame 336 has a frame body 337. The frame bodies 335, 337 may be metal plates or blocks used to support the grinding wheel 302. In the illustrated embodiment, the frames 334, 336 have curved top surfaces 338. The guide frame 334 has a planar first bottom surface 340 and the support frame 336 has a planar second bottom surface 342. The bottom surfaces 340, 342 are configured to rest on the substrate as the tapering device 172 is advanced along the substrate 104 to remove the material 102. In various embodiments, the bottom surfaces 340, 342 are defined by the bottom surfaces 340a, 342a (FIG. 9) of the frame bodies 335, 337. In other various embodiments, the holder 300 includes a first foot 344 and a second foot 346 (together defining feet 344, 346) at the bottom surfaces 340a, 342a of the frame bodies 335, 337, respectively, that define portions of the frames 334, 336. The first foot 344 defines the first bottom surface 340b of the holder 300 and the second foot 346 defines the second bottom surface 342b of the holder 300. Optionally, the feet 344, 346 are removable and replaceable to adjust the height of the holder 300.

The holder 300 includes a pair of cross frames 348 extending between the guide frame 334 and the support frame 336. In an exemplary embodiment, the frames 334, 336, 348 are separate pieces secured together. For example, the frames 334, 336, 348 may be secured using fasteners 350. The frames 334, 336, 348 are assembled with the grinding wheel 302. For example, the frames 334, 336 may be coupled to opposite sides of the grinding wheel 302 and secured together using the cross frames 348. In alternative embodiments, the cross frames 348 may be integral with the guide frame 334 and/or the support frame 336.

In an exemplary embodiment, the frames 334, 336 include openings 352 for receiving the grinding wheel 302. Bearings 354 are received in the openings 352 for supporting the grinding wheel 302. The openings 352 are open between an exterior surface 356 and an interior surface 358 of the corresponding frame 334, 336. The interior surfaces 358 of the frames 334, 336 face each other across a gap that receives the grinding wheel 302. Portions of the grinding wheel 302 may extend beyond the exterior surface 356 of the guide frame 334 and/or beyond the exterior surface 356 of the support frame 336. In use, the exterior surface 356 of the guide frame 336 is configured to abut against the datum edge 142 (shown in FIG. 2) of the guide rail 110 (shown in FIG. 2) to guide advancing of the tapering device 172 during use. The bottom surfaces 340, 342 are located precise distances from the openings 352 to control positioning of the grinding wheel 302 relative to the bottom surfaces 340, 342.

The grinding wheel 302 includes an axle 360 and a grinding section 362 along the axle 360. The grinding section 362 has a grinding surface 364 used for removing the material 102 when the tapering device 172 is operated. The grinding surface 364 is the exterior surface of the grinding section 362. The grinding surface 364 extends circumferentially around the grinding wheel 302. In the illustrated embodiment, the grinding surface 364 of the tapering device grinding wheel 302 is oriented transverse to the axle 360. The grinding surface 364 is angled to taper the material 102 as the material 102 is removed. The grinding surface 364 is used to grind away the material 102 to create a planar, but tapered, surface on the substrate 104. In other embodiments, the grinding surface 364 may be non-planar, such as curved to create a non-planar tapered surface in the material 102.

Optionally, various embodiments of the grinding wheel 302 include one or more spacing sections (not shown) along the axle 360 such as at one or both sides of the grinding section 362. The spacing section spaces the grinding section 362 a longitudinal distance from the interior surface 358 of the guide frame 334 or from the interior surface 358 of the support frame 336. The position of the grinding surface 364 relative to the exterior surface 356 of the guide frame 334, and thus relative to the datum edge 142, may be precisely controlled by controlling the width of the spacing section.

In an exemplary embodiment, the grinding wheel 302 is manufactured from a common, unitary body 370. For example, the axle 360, any spacing sections and the grinding section 362 are all milled from a single piece of metal. An end 372 of the axle 360 extends beyond the exterior surface 356 of the guide frame 334 for attachment to the actuator 160. The actuator 160 is operated to rotate the axle 360, which causes rotation of the grinding surface 364.

The actuator 160 includes a motor 380 operated to rotate a spindle 382. A chuck 384 is coupled to the spindle 382. The chuck 384 is secured to the axle 360 to rotate the axle 360. In an exemplary embodiment, an axis of rotation 386 of the spindle 382 and the axle 360 is oriented perpendicular to the motor 380. A throttle 388 is operably coupled to the motor 380 to control the speed of rotation of the actuator 160 and the grinding wheel 302. In other embodiments, the grinding wheel 302 may be operably coupled to the actuator 160 by other means.

In an exemplary embodiment, the tapering device 172 is used for precision material removal from the substrate 104. For example, the grinding surface 364 is used to blend the material 102 between the cut performed by the planing device grinding wheel 202 and the exterior surface of the material 102. The tapering device 172 leaves behind material 102 for the new material to be reapplied and secured to the existing material.

In an exemplary embodiment, because the guide frame 334 slides along one section of the substrate 104 while the support frame 336 slides along a different section of the substrate 104 (for example, the guide frame 334 slides along the exterior of the material 102 while the support frame 336 slides along the thin remaining layer 132 left behind after the cut by the planing device 170 or slides along the composite layer 126), the vertical height of the grinding surface 364 relative to the first bottom surface 340 needs to be controlled and the vertical height of the grinding surface 364 relative to the second bottom surface 342 needs to be controlled.

In an exemplary embodiment, the first bottom surface 340 is vertically offset relative to the second bottom surface 342 a first vertical distance 390 (FIG. 10). For example, the first bottom surface 340 is relatively higher and the second bottom surface 342 is relatively lower, i.e. the first bottom surface 340 is set a first distance from the axis of rotation 386 of the spindle 382 and the second bottom surface 342 is set a second distance from the axis of rotation 386 of the spindle 382, wherein the first distance is less than the second distance. Having the first and second bottom surfaces 340, 342 vertically offset allows the guide frame 334 to be supported by different layers of the substrate 104 while maintaining the proper or desired orientation of the grinding surface 364 relative to the substrate 104. The grinding surface 364 is tapered between the first and second bottom surfaces 340, 342. In the illustrated embodiment, the grinding surface 364 is lower near the support frame 336 and higher near the guide frame 334. The angle of taper of the grinding surface 364 between the guide and support frames 334, 336 defines the angle of taper of the section 116 of the material 102. The grinding surface 364 is positioned slightly above the second bottom surface 342 a vertical distance 392 (FIG. 10). The grinding surface 364 is positioned slightly above the first bottom surface 340 a vertical distance 394 (FIG. 10), which may be equal to the vertical distance 392. In an exemplary embodiment, the holder 300 has a support plane 396 defined between the guide frame 334 and the support frame 336, such as between the first and second bottom surfaces 340, 342 at the interior surfaces 358 of the frames 334, 336. Because the first and second bottom surfaces 340, 342 are at different vertical heights, the support plane 396 is non-horizontal. In various embodiments, the grinding surface 364 is nonparallel to the support plane 396. In other various embodiments, such as when the vertical distances 392, 394 are equal, the grinding surface 364 is parallel to the support plane 396.

Figure 11:
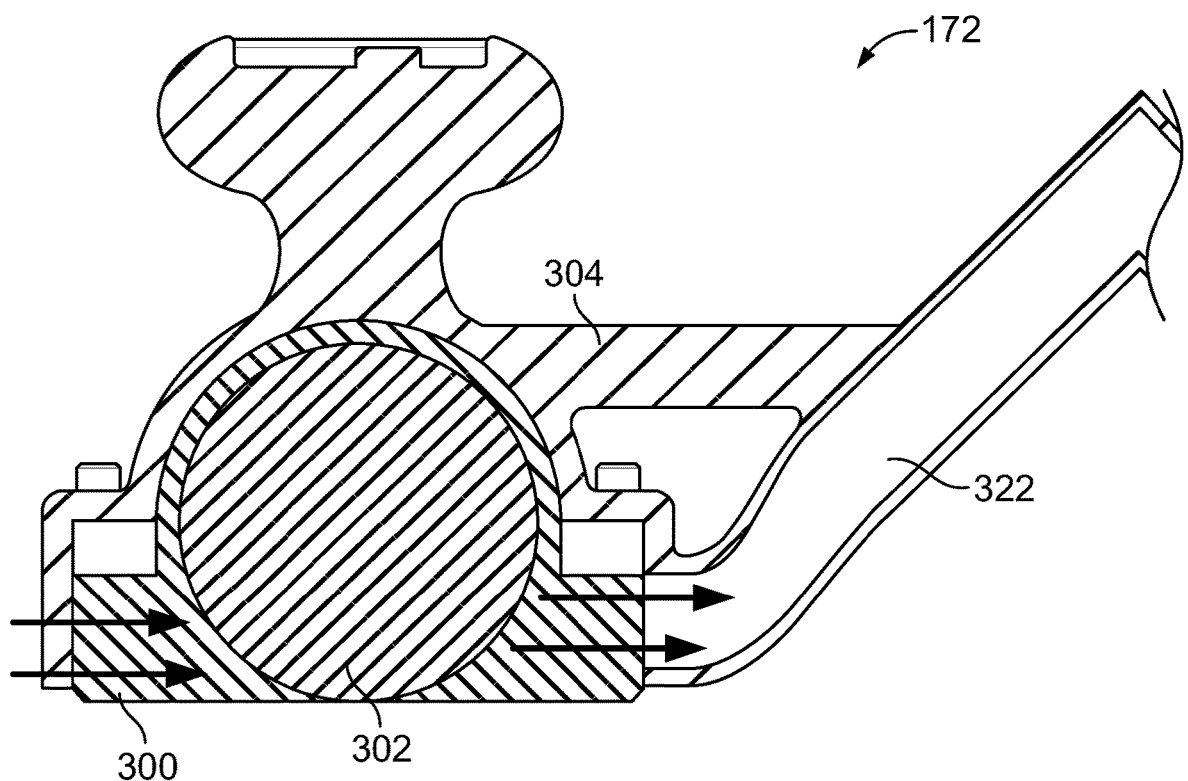
FIG. 11 is a cross-sectional view of the tapering device.

FIG. 11 is a cross-sectional view of the tapering device 172 showing the cover 304 coupled to the holder 300 around the grinding wheel 302. FIG. 11 shows airflow through the tapering device 172, which is used to remove the material from the tapering device 172. For example, a vacuum may be created through the funnel 322 to remove the ground material pieces.

Figure 12:
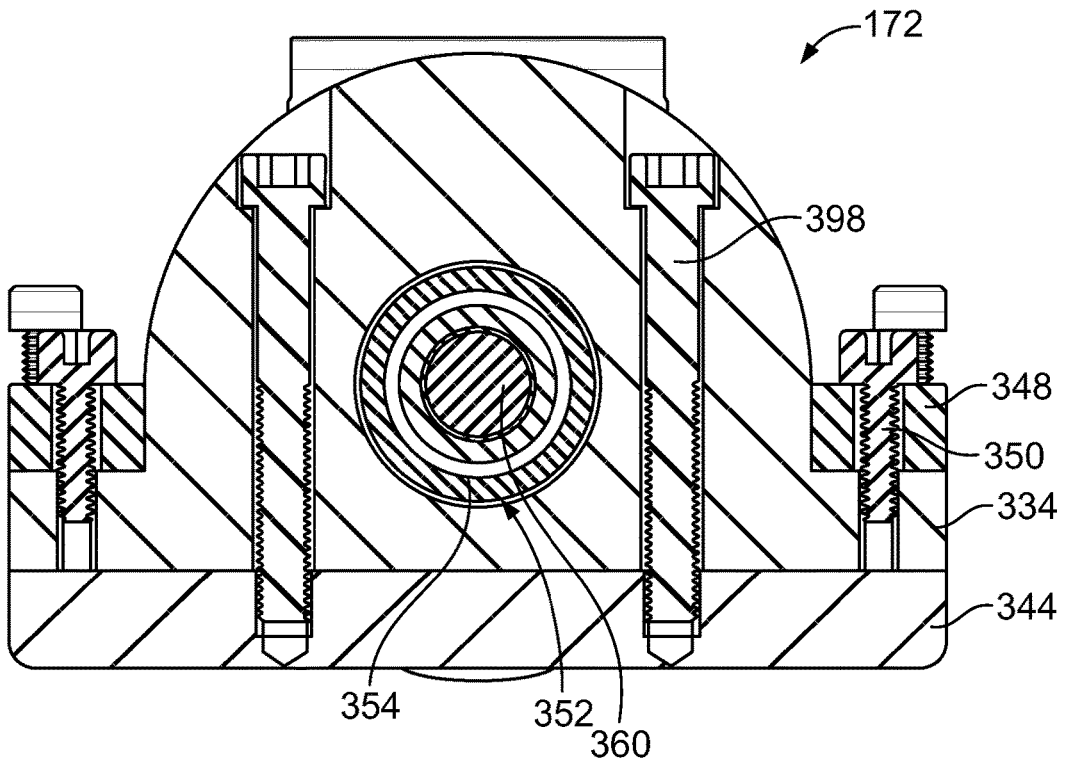
FIG. 12 is a cross-sectional view of the tapering device.

FIG. 12 is a cross-sectional view of the tapering device 172 with the cover 304 removed for clarity. FIG. 12 shows the fasteners 350 securing the cross frames 348 to the guide frame 334. The bearing 354 is shown in the opening 352. The axle 360 is supported by the bearing 354. In the illustrated embodiment, fasteners 398 are used to secure the first foot 344 to the guide frame 334.

FIGS. 13A-13H show an exemplary material removal process using the material removal system 100 to remove the material 102 from the substrate 104 and replace with new material 402 after a repair in accordance with an exemplary embodiment. FIG. 13A shows the workpiece prior to removal of the material 102 from the substrate 104. In the illustrated embodiment, the material 102 overlaps the joint 124 between the panels 120, 122. The material 102 may have any thickness. In various embodiments, the material 102 is a radar absorbing material (RAM) having a specified required thickness, such as a thickness of approximately 0.05"; however the material 102 may have other thicknesses in other various embodiments.

FIG. 13B shows the workpiece with a section 118 of the material 102 removed from the substrate 104. The section 118 overlaps the joint 124. In an exemplary embodiment, the section 118 is removed to the composite layer 126, which may be the base layer 105 of the substrate 104. For example, the material 102 is completely removed in the section 118. In an exemplary embodiment, the material 102 remains on both sides of the section 118. In an exemplary embodiment, the guide rail 110 is applied to the substrate 104 along one side of the section 118, such as along an external surface 138 of the material 102. The guide rail 110 is positioned a distance from the section 118. Optionally, guide rails 110 may be applied to both sides of the section 118. The guide rail 110 may be applied to the exterior surface of the material 102 on the substrate 104.

FIG. 13C shows the material removal system 100 removing the section 114 of the material 102 from the substrate 104. FIG. 13D shows the workpiece with the section 114 of the material 102 removed. The planing device 170 is used to remove the section 114. In an exemplary embodiment, the planing device 170 removes the section 114 such that the thin remaining layer 132 remains in the section 114 on the substrate 104. The planing device 170 leaves the thin remaining layer 132 such that the planing device grinding wheel 202 does not damage the metallized coating layer 128. The remaining layer 132, in various embodiments, is planar and may be parallel to the base layer of the substrate, such as horizontal.

In use, the guide frame 234 is guided by the guide rail 110 as the planing device 170 is advanced along the workpiece to remove the section 114 of the material 102. For example, the exterior surface 256 of the guide frame 234 abuts against the datum edge 142 of the guide rail 110. The planing device 170 may be set up to leave behind the remaining layer 132 having a minimal thickness, such as a thickness to ensure that the metallized coating layer 128 is not marred or damaged by the planing device 170. For example, in various embodiments, the planing device 170 may leave behind the remaining layer having a thickness of approximately 0.010"; however, the planing device 170 may be set up to leave behind a remaining layer having a different thickness. After the planing device 170 removes the section 114, the thin remaining layer 132 may be removed by hand sanding or other processes to expose the composite layer 126 and/or the metallized coating layer 128. Hand sanding of the thin remaining layer 132 may be accomplished without damaging the metallized coating layer 128 and/or the composite layer 126. Leaving behind the thin remaining layer 132 allows the material 102 to be quickly removed by hand sanding as an operator does not need to hand sand the entire thickness of the material 102, but rather only needs to hand sand the thin remaining layer 132.

In operation, when the grinding operation is initiated, one or neither of the bottom surfaces 240 and/or 242 may contact the substrate 104. The planing device 170 is pressed downward into the material 104 to begin removing the material 104. As material is removed during the grinding operation, initially one of the bottom surfaces 240 and/or 242 contacts the substrate 104. Eventually, both bottom surfaces 240 and 242 rest on and are supported by the substrate 104, which indicates that no further material can be removed from that particular section without advancing the planing device 170 forward along the surface of the substrate 104 to remove more of the layer 114 forward of the location of the planing device 170. The planing device 170 is advanced forward to continue to remove the section 114 in a strip.

As described above, the bottom surfaces 240, 242 (which may be the bottom surfaces of the frames in embodiments without feet or the bottom surfaces of the feet in embodiments with the feet) are vertically offset to allow the guide frame 234 and the support frame 236 to rest on different layers of the substrate 104. For example, in various embodiments, the guide frame 234 rests on an external surface 138 of the material 102 and the support frame 236 rests on the base layer 105, such as the outer composite layer 126. The offset distances between the grinding wheel 202 and the bottom surfaces 240, 242 control the thicknesses of the material removed and the thickness of the remaining layer 132. For example, in the illustrated embodiment, the thickness of the remaining layer 132 is controlled by the offset distance between the grinding wheel 202 and the bottom surface 242 and the thickness of the material removed is controlled by the offset distance between the grinding wheel 202 and the bottom surface 240.

FIG. 13E shows the material removing system 100 removing the section 116 of the material 102 from the substrate 104. FIG. 13E shows the thin remaining layer 132 from FIG. 13D removed, such as by hand sanding. The tapering device 172 is used to remove the section 116. In an exemplary embodiment, the tapering device 172 removes the section 116 such that the material 102 is tapered at a non-horizontal angle between the substrate 104 and the exterior surface of the material 102.

In use, the guide frame 334 is guided by the guide rail 110 as the tapering device 172 is advanced along the workpiece to remove the section 116 of the material 102. For example, the exterior surface 356 of the guide frame 334 abuts against the datum edge 142 of the guide rail 110. The tapering device 172 leaves behind a tapered remaining layer 134 having a tapered edge 136 that increases in thickness from the substrate 104 to the external surface 138 of the material 102. For example, the tapering device 172 may taper the remaining layer 134 from the base layer 105 at the lower end to the external surface 138 at the upper end; however, the tapering device 172 may be set up to leave behind a remaining layer 134 having a different tapered thickness in other various embodiments. After the tapering device 172 removes the material 102 from the section 116, the remaining layer 134 provides an edge for the new material to tie in with when reapplied.

Comparing FIGS. 13C and 13E shows the planing grinding surface 264 offset from the tapering grinding surface 364 to remove the different sections 114, 116 of the material 102. For example, the planing grinding surface 264 is a first distance 400 from the corresponding guide frame 234 and the tapering grinding surface 364 is a second distance 401 from the corresponding guide frame 334. The first and second distances 400, 401 are different. When the guide frame 264 of the planing device 170 abuts against the datum edge 142 of the guide rail 110, the planing grinding surface 264 is positioned relative to the substrate 104 to remove the first section 114. When the guide frame 364 of the tapering device 172 abuts against the datum edge 142 of the guide rail 110, the tapering grinding surface 364 is positioned relative to the substrate 104 to remove the second section 116.

FIG. 13F shows the workpiece with a layer of new material 402 reapplied over the joint 124 in the space where the material removal system 100 removed the material 102. The new material 402 ties in with the old material 102. For example, the new material 402 fills the sections 114, 116, 118 where the old material 102 was removed. In an exemplary embodiment, when the new material 402 is applied, the new material 402 is applied to the external surface 138 of the old material 102, creating a bump 404. The material removal system 100 is used to remove the bump 404.

FIG. 13G shows the material removal system 100 removing the bump 404. FIG. 13H shows the workpiece with the bump 404 removed. The material removal system 100 includes a planing device 174 for moving the bump 404. The planing device 174 is similar to the planing device 170; however, the planing device 174 includes a grinding wheel 410 having a grinding surface 412 coplanar with bottom surfaces 414, 416 of a holder 418. The bottom surface 414 of the holder 418 rides along the old material 102 while the bottom surface 416 of the holder 418 rides along the new material 402. The grinding surface 412 removes the bump 404 such that the external surface of the workpiece is planar. The old material 102 is coplanar with the new material 402.

In alternative embodiments, rather than having the guide rail 110 on the external surface 138 of the material 102, the guide rail 110 may be mounted to the base layer 105, such as at or near the joint 124. The guide rail 110 may be mounted to other layers in other alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A material removal device for removing material from a substrate, the material removal device comprising:
    a holder extending between first and second sides, the holder having a guide frame at the first side and a support frame at the second side, the guide frame having a first bottom surface, the support frame having a second bottom surface, the first and second bottom surfaces being vertically offset from each other; and
    a grinding wheel supported by the holder and being operable to remove the material from the substrate, the grinding wheel having an axle bearing on and supported by the guide frame and the axle bearing on and supported by the support frame, the grinding wheel having a grinding surface, the grinding surface being located below the first bottom surface and above the second bottom surface.

2. The material removal device of claim 1, wherein the first bottom surface is configured to rest on the substrate and the second bottom surface is configured to rest on the material a distance above the substrate.

3. The material removal device of claim 1, wherein the grinding surface is parallel to the axle.

4. The material removal device of claim 1, wherein the grinding surface is angled transverse relative to the axle.

5. The material removal device of claim 1, wherein the grinding wheel is configured to remove a layer of the material having a thickness equal to a vertical distance between the grinding surface and the first bottom surface.

6. The material removal device of claim 1, wherein the grinding wheel is configured to leave a layer of the material on the substrate having a thickness equal to a vertical distance between the grinding surface and the second bottom surface.

7. The material removal device of claim 1, further comprising a cover attached to the holder and partially surrounding the grinding wheel, the cover having a handle used to advance the material removal device in a grinding direction along the substrate.

8. The material removal device of claim 7, wherein the cover includes a funnel for collecting the material removed by the grinding wheel.

9. The material removal device of claim 1, further comprising an actuator operably coupled to the axle to rotate the grinding wheel.

10. The material removal device of claim 1, further comprising bearings held in the guide frame and the support frame, the bearings supporting the axle.

11. The material removal device of claim 1, wherein the axle and the grinding wheel are integral including a common, unitary body.

12. The material removal device of claim 1, wherein the guide frame includes a guide surface configured to engage a guide rail to guide advancing of the material removal device in a grinding direction along the substrate.

13. The material removal device of claim 1, wherein the first bottom surface is milled down to a first offset distance from the grinding surface and the second bottom surface is milled down to a second offset distance from the grinding surface.

14. The material removal device of claim 1, wherein the holder includes removable feet at bottoms of the guide frame and the support frame defining the first and second bottom surfaces, the removable feet being replaceable to adjust the position of the grinding wheel relative to the substrate.

15. The material removal device of claim 1, wherein the holder has a support plane defined between the guide frame and the support frame, the grinding surface being nonparallel to the support plane.

16. The material removal device of claim 15, wherein the support plane is non-horizontal.

17. A material removal device for removing material from a substrate, the material removal device comprising:
    a holder extending between first and second sides, the holder having a guide frame at the first side and a support frame at the second side, the guide frame having a first bottom surface, the support frame having a second bottom surface, the first and second bottom surfaces being vertically offset from each other; and
    a grinding wheel supported by the holder and being operable to remove the material from the substrate, the grinding wheel having an axle extending between the guide frame and the support frame and being generally parallel to the substrate, the grinding wheel having a grinding surface rotated around the axel, the grinding surface being located below the first bottom surface and above the second bottom surface.

18. The material removal device of claim 17, wherein the first bottom surface is configured to rest on the substrate and the second bottom surface is configured to rest on the material a distance above the substrate.

19. A material removal device for removing material from a substrate, the material removal device comprising:
    a holder extending between first and second sides, the holder having a guide frame at the first side and a support frame at the second side, the guide frame having a first bottom surface, the support frame having a second bottom surface, the first and second bottom surfaces being planar, the first and second bottom surfaces being parallel to each other and being vertically offset from each other; and
    a grinding wheel supported by the holder and being operable to remove the material from the substrate, the grinding wheel having an axle supported by the guide frame and the support frame, the grinding wheel having a grinding surface, the grinding surface being located below the first bottom surface and above the second bottom surface.

20. The material removal device of claim 19, wherein the first bottom surface is configured to rest on the substrate and the second bottom surface is configured to rest on the material a distance above the substrate.

* * * * *